US011017180B2

(12) United States Patent
Gandhi et al.

(10) Patent No.: US 11,017,180 B2
(45) Date of Patent: May 25, 2021

(54) SYSTEM AND METHODS FOR PROCESSING AND INTERPRETING TEXT MESSAGES

(71) Applicant: HelpShift, Inc., San Francisco, CA (US)

(72) Inventors: Yashkumar Gandhi, Pune (IN); Srinivas Nagamalla, Pune (IN); Christian Leipski, San Francisco, CA (US)

(73) Assignee: Helpshift, Inc., San Francisco, CA (US)

( * ) Notice: Subject to any disclaimer, the term of this patent is extended or adjusted under 35 U.S.C. 154(b) by 102 days.

(21) Appl. No.: 16/379,492

(22) Filed: Apr. 9, 2019

(65) Prior Publication Data
US 2019/0325029 A1 Oct. 24, 2019

Related U.S. Application Data

(60) Provisional application No. 62/659,606, filed on Apr. 18, 2018.

(51) Int. Cl.
G06F 40/49 (2020.01)
H04L 12/58 (2006.01)
(Continued)

(52) U.S. Cl.
CPC ............ G06F 40/49 (2020.01); G06F 16/35 (2019.01); G06F 40/284 (2020.01); G06F 40/30 (2020.01); G06Q 30/016 (2013.01); H04L 51/046 (2013.01)

(58) Field of Classification Search
None
See application file for complete search history.

(56) References Cited

U.S. PATENT DOCUMENTS 6,606,620 B1 * 8/2003 Sundaresan ............ G06F 16/30
7,194,471 B1 3/2007 Nagatsuka et al.
(Continued)

OTHER PUBLICATIONS

Kobayashi et al., "Text Mining in Organizational Research", sagepub.com/journalsPermissions.nav DOI: 10.1177/1094428117722619, Aug. 10, 2017 (retrieved on Jun. 16, 2019). Retried from the internet: <URL: https://journals.sagepub.com/doi/pdf/10.1177/1094428117722619> pp. 1-33.
(Continued)

Primary Examiner — Paras D Shah
Assistant Examiner — Nicole A Kotulak
(74) Attorney, Agent, or Firm — FisherBroyles LLP; Alan D. Minsk

(57) ABSTRACT

Systems, apparatuses, and methods for the interpretation and routing of short text messages, such as those that might be received as part of a "chat" between a customer and a customer service representative. In some embodiments, this is achieved by constructing word "vectors" based on the text in a message, with a token corresponding to each word. The word vectors are then compared to a set of mutually orthogonal unit vectors representing the "classes" or "categories" of messages that are received and are intended to be acted upon by a person or automated process. The orthogonal class unit vectors are generated by training a machine learning model using a set of previously classified text or messages.

20 Claims, 11 Drawing Sheets

(51) Int. Cl.
  *G06F 16/35*  (2019.01)
  *G06Q 30/00*  (2012.01)
  *G06F 40/30*  (2020.01)
  *G06F 40/284*  (2020.01)

(56) References Cited

U.S. PATENT DOCUMENTS

| | | |
|---|---|---|
| 9,619,551 B2 | 4/2017 | Gallivan et al. |
| 2010/0151889 A1 | 6/2010 | Chen et al. |
| 2012/0330958 A1* | 12/2012 | Xu .......................... G06F 17/16 707/738 |
| 2013/0138641 A1* | 5/2013 | Korolev ............ G06F 16/24578 707/730 |
| 2013/0159236 A1* | 6/2013 | Vladislav ............... G06N 5/003 706/46 |
| 2013/0273976 A1* | 10/2013 | Rao ..................... H04L 12/1822 455/563 |
| 2014/0278359 A1 | 9/2014 | Speer et al. |
| 2014/0280166 A1* | 9/2014 | Bryars ................ G06F 16/9535 707/738 |
| 2014/0288932 A1 | 9/2014 | Yeracaris et al. |
| 2016/0314607 A1 | 10/2016 | Evans |
| 2018/0336207 A1* | 11/2018 | Dunne ................... G06F 16/35 |

OTHER PUBLICATIONS

International Search Report and Written Opinion, dated Jul. 3, 2019 in PCT/US2019/026607, international filing date Apr. 9, 2019.

* cited by examiner

SYSTEM AND METHODS FOR PROCESSING AND INTERPRETING TEXT MESSAGES

CROSS REFERENCE TO RELATED APPLICATION

This application claims the benefit of U.S. Provisional Application No. 62/659,606, entitled "System and Methods for Processing and Interpreting Text Messages," filed Apr. 18, 2018, which is incorporated herein by reference in its entirety (including the Appendix) for all purposes.

BACKGROUND

In addition to viewing webpages, answering email, and making purchases, mobile devices, such as smartphones and tablet computers, are also being used in many different work environments and to perform many different functions related to conducting business. For example, a user may require the assistance of a customer support representative to help them to resolve a problem they are having with a product or service. For purposes of convenience, a user may prefer to contact or communicate with a customer service representative using text messaging or some form of abbreviated message, such as a "chat" window or in-app messaging.

However, a problem may arise in interpreting and hence responding to such text messages or similar forms of abbreviated communication. For example, a hastily prepared message may contain errors in spelling or punctuation. In addition, even if the contents of a message can be determined with a sufficient level of confidence, the meaning of the message may be uncertain or ambiguous. For example, the contents of a message may be such that it could refer to one of several functions or requests, such as for placing an order, asking about order status, making a payment for an order, making a return, presenting a question regarding the operation of a device, etc. And, in order for the message recipient (which may be a person or internal data processing function) to route the message or request to the appropriate customer service representative or process, it is important that a message's content and intent be accurately determined. This means that efforts to automate at least portions of a user's interactions with a customer service process may depend on how accurately and efficiently the customer service process can understand and act on received text messages.

As suggested, an automated or partially automated process for providing customer service support needs to be able to accurately and efficiently determine what a customer/user is asking or requesting in a text message or other communication. In some cases, this may be determined by generating a "score" for a message, where the score is indicative of the confidence the scoring process has in the class, purpose or label the process associates with the message. However, conventional message processing and scoring approaches tend to cluster around values that do not provide sufficient information to enable a decision regarding what the user/customer wants or how best to route the received message. For example if one of the class has a relatively high weighting during training, a new, unseen document tends to be classified more aggressively into that class even when the document actually belongs to another class.

As noted, conventional approaches to text messaging processing (particularly for brief or short messages) suffer from one or more significant disadvantages. Thus, systems and methods are needed for more efficiently and cost-effectively performing the processing, interpretation, and routing of short text messages, particularly in the context of a customer service process. Embodiments of the invention are directed toward solving these and other problems individually and collectively.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for the interpretation and routing of short text messages, such as those that might be received as part of a "chat" between a customer and a customer service representative or system. In some embodiments, this is achieved by constructing word "vectors" based on the text in a message, with a token corresponding to each word. The word vectors are then compared to a set of mutually orthogonal unit vectors representing the "classes" or "categories" of messages that are received and are intended to be acted upon by a person or automated process. The orthogonal class unit vectors are generated as a result of training a machine learning model using a set of previously classified text or messages. The word and/or document vectors prepared from a previously unclassified text or message are compared to the orthogonal class vectors, where the comparison is based on geometrical concepts of the "closeness" of, or distance between, two vectors as determined by evaluation of a defined metric. In one sense this operation may be thought of as looking at the "projection" of a particular word vector onto each of the class unit vectors and taking the unit vector having the maximum projection value. In one embodiment, a linear combination of unit vectors may be constructed that represent the relative contributions of multiple classes to the "class" of a message. Further, although a Euclidean metric is mentioned as being used in some embodiments, note that other forms of metric may be used (such as Cosine distance, similarity, etc.). In some embodiments, the choice of metric may depend on the specific use case and/or type of data available.

In one embodiment, after some normalization and processing (described with reference to FIG. 6), a vector representing an entire document/message is compared to the set of mutually orthogonal unit vectors to determine which class, category, or label best represents the document (i.e., that for which the comparison metric is a maximum value). This allows the received text message to be assigned a category or label as a form of classification, where the classification may be used to decide how best to continue with the processing of, and responding to, the message (such as where to route the message, what type of response to generate, what action or event to initiate, etc.). The classification operation or process may also (or instead) be used for generating certain operational metrics, triggering an automated function or process (such as a chatbot), escalating a response to an event, etc.

As mentioned, in order to perform the classification of a vector for a new document, the system and methods described herein first construct a "model" based on a corpus of other documents. The model is "trained" using the corpus of documents, which may consist of a set of actual text messages which have been annotated, i.e., to which have been appended one or more labels, where the labels function to characterize the class or classes to which the message belongs. In some embodiments, this corpus can be downloaded from a database provided by the Assignee of the current application, and be subjected to certain filters. Such a corpus can also be imported from an external system, and in rare cases, created manually. Annotation of the corpus entries can be performed manually or by an algorithmic process.

For a manual annotation process, a human and/or crowd sourcing platform may be used to review every text sample and based on a set of rules, add an appropriate annotation/label. For an algorithmically assisted annotation process, the corpus typically undergoes unsupervised clustering that generates buckets/clusters of issues that belong to a similar class. A human can then add annotations to these buckets, which are far less in number as compared to the total volume of the corpus, thereby significantly reducing the annotation burden. Note that the class or classes may be determined to some degree by the use case or needs of a specific user or set of users; for example, the corpus may have a set of labels that are specific to a set of actions or responses desired by a user or set of users for their business or operational purposes (such as specific to their customer support, manufacturing, data tracking, accounting system, etc.).

In one embodiment, the invention is directed to a computer-implemented method for processing a document, where the method includes:
  accessing a digital representation of the document;
  converting the digital representation into a document vector;
  applying a transformation matrix to the document vector to produce a transformed document vector, wherein the transformation matrix is determined by comparing a set of document vectors generated from a corpus of documents to a corresponding set of transformed document vectors, and further, wherein for each document vector in the set of document vectors, the corresponding transformed document vector is obtained by a back-fitting process of the document vector with respect to a set of mutually orthogonal class vectors, where each of the mutually orthogonal class vectors represent a possible classification of the document and where the back-fitting process includes consideration of the probability of a word appearing in a document given a particular topic and the probability of a document belonging to a topic for the corpus of documents;
  comparing the transformed document vector to the set of mutually orthogonal class vectors, where each of the mutually orthogonal class vectors represent a possible classification of the document; and
  based on the comparison, determining a most likely classification for the document.

In another embodiment, the invention is directed to a data processing system for processing and classifying text messages, comprising:
  an electronic processor programmed with a set of computer-executable instructions;
  a non-transitory electronic storage element storing the set of computer-executable instructions, wherein the set of computer-executable instructions further includes
    computer-executable instructions, which when executed cause the system to access a set of documents, wherein each document in the set of documents is associated with a classification; computer-executable instructions, which when executed cause the system to, for each document in the set of documents, convert text in each document into a set of tokens and to generate a word vector from each significant token;
    computer-executable instructions, which when executed cause the system to perform a back-fitting process on each of the generated word vectors with respect to a set of mutually orthogonal class vectors, where each of the mutually orthogonal class vectors represent a possible classification of a document and where the back-fitting process includes consideration of the probability of a word appearing in a document given a particular topic and the probability of a document belonging to a topic for the corpus of documents;
    computer-executable instructions, which when executed cause the system to process a result of back-fitting the generated word vectors to produce a set of document vectors, with each document vector in the set corresponding to one of the documents in the accessed set of documents;
    computer-executable instructions, which when executed cause the system to perform a back-fitting process on each document vector in the set of document vectors to produce a set of transformed document vectors;
    computer-executable instructions, which when executed cause the system to determine a transformation between the set of document vectors and the set of transformed document vectors;
    computer-executable instructions, which when executed cause the system to access a digital representation of a document not in the set of documents;
    computer-executable instructions, which when executed cause the system to convert the digital representation of the document not in the set of documents into a document vector;
    computer-executable instructions, which when executed cause the system to apply the determined transformation to the document vector to produce a transformed document vector;
    computer-executable instructions, which when executed cause the system to compare the transformed document vector to the set of mutually orthogonal class vectors; and
    computer-executable instructions, which when executed cause the system to determining a most likely classification for the document based on the comparison.

In yet another embodiment, the invention is directed to a non-transitory computer-readable medium comprising instructions which, when executed by a computer, cause the computer to:
  access a set of documents, wherein each document in the set of documents is associated with a classification;

for each document in the set of documents, convert text in each document into a set of tokens and to generate a word vector from each significant token;

perform a back-fitting process on each of the generated word vectors with respect to a set of mutually orthogonal class vectors, where each of the mutually orthogonal class vectors represent a possible classification of a document and where the back-fitting process includes consideration of the probability of a word appearing in a document given a particular topic and the probability of a document belonging to a topic for the corpus of documents;

process a result of back-fitting the generated word vectors to produce a set of document vectors, with each document vector in the set corresponding to one of the documents in the accessed set of documents;

perform a back-fitting process on each document vector in the set of document vectors to produce a set of transformed document vectors; and determine a transformation between the set of document vectors and the set of transformed document vectors.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

DETAILED DESCRIPTION

Figure 1:
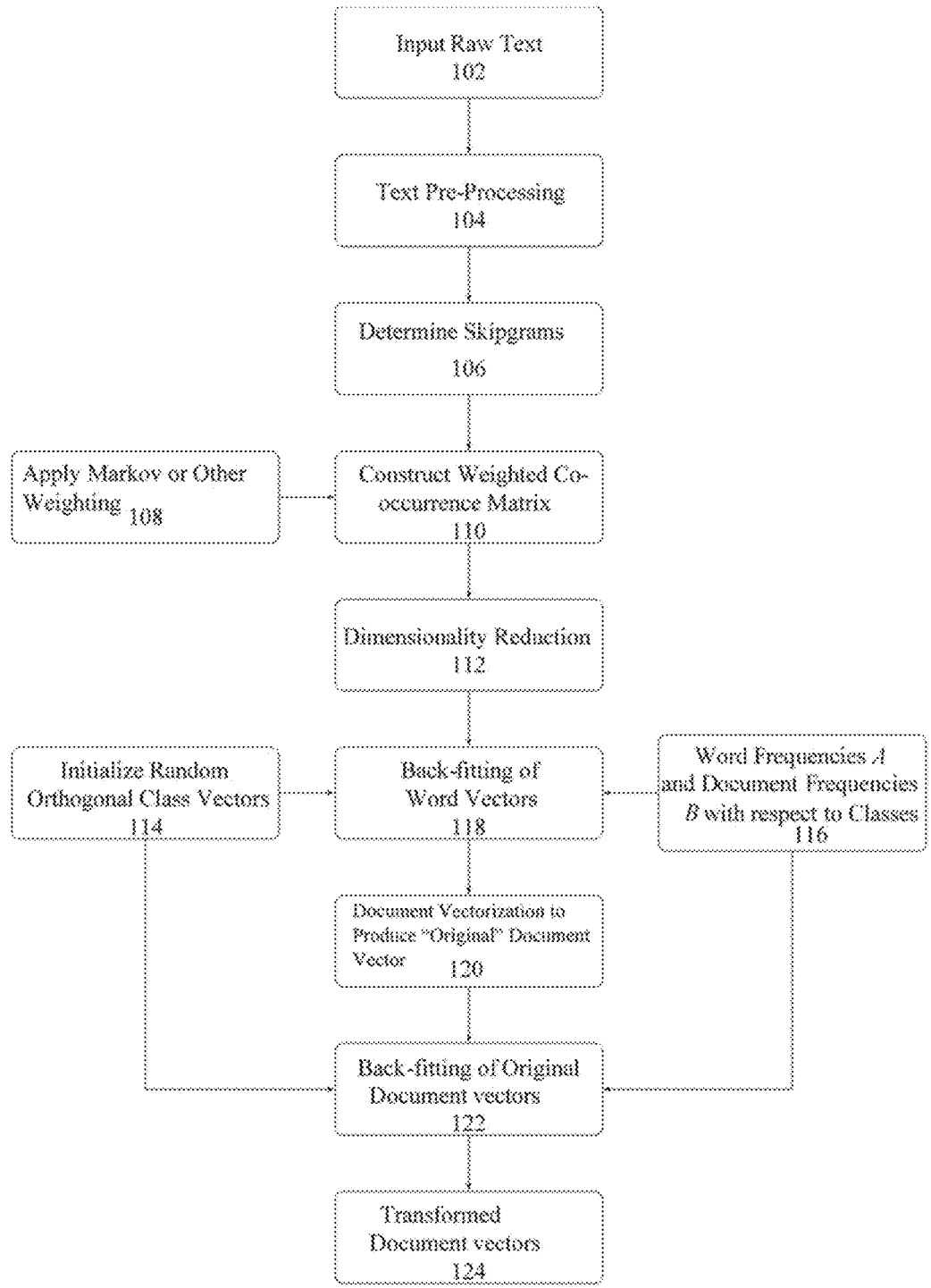
FIG. 1 is a flowchart or flow diagram illustrating a process, method, operation or function for training a text-classification engine and that may be used in implementing an embodiment of the systems and methods described herein.

The subject matter of embodiments of the invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the invention may be practiced. The invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the invention may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, graphics processing unit (GPU), controller, etc.) that is part of a client device, server, network element, or other form of computing or data processing device/platform and that is programmed with a set of executable instructions (e.g., software instructions), where the instructions may be stored in a suitable non-transitory data storage element. In some embodiments, one or more of the operations, functions, processes, or methods described herein may be implemented by a specialized form of hardware, such as a programmable gate array, application specific integrated circuit (ASIC), or the like. Note that an embodiment of the methods or processes described may be implemented in the form of an application, a sub-routine that is part of a larger application, a "plug-in", an extension to the functionality of a data processing system or platform, or any other suitable form. The following detailed description is, therefore, not to be taken in a limiting sense.

As mentioned, conventional short text message processing approaches suffer from several disadvantages or sub-optimal features. These include one or more of the following:

Naïve Bayes Method is one of the most widely used algorithms for classification. However, the method is generally very aggressive in its scoring and sometimes ends up overfitting a dataset. By this observation, the inventors recognized that the Naïve Bayes method may perform excellently for text that is similar to what it has "seen" previously, but the result becomes ambiguous otherwise, making it difficult to determine an appropriate threshold of confidence;

Logistic regression is another widely used method, but it takes sufficient time to build and inherently performs well for binary classification. For multinomial classification, it is relatively slow, making it difficult to use. It is also known to become easily biased when there are strong correlations between different independent variables or between the independent variables and a dependent variable; and Similarly, Support Vector Machines (SVM) cannot be used efficiently as the choice of kernel is not that straightforward for nonlinear patterns. Also, if the data has more than two classes, then the method may not be optimal. Another problem is that the scores need to be relatively scaled, thereby making it difficult to define a classification threshold for practical use.

Thus although conventional methods exist for classifying text or messages, these methods may not scale well in an operational setting; they also suffer from generally being limited to effectiveness for binary classifications instead of the case of multiple classes, which is often encountered in operational settings.

In contrast, embodiments of the system and methods described herein are intended to overcome the disadvantages or sub-optimal features of conventional approaches by accomplishing the following goals:

the method should generate non-aggressive, smooth scores to give a better idea of relative scoring;

every label should indicate its own likelihood, and hence a distance-based approach seemed desirable;

the method should be able to handle the non-linear nature of data;

the method should remove the bias associated with strong correlations in the data;

the model should be able to handle spelling mistakes and out of vocabulary words efficiently; and the model should be relatively (or comparatively) quick to build, deploy and test.

A concept underlying one or more embodiments is to find the vector representing the centroid of a class by taking a mean across all the words in the class, and iteratively drift each of the corresponding word vectors closer to the centroid of the class. Due to the inherent noise in models, it was observed that the semantic space of the word embeddings was cluttered with indistinct boundaries. In order to provide a more distinct and discriminating boundary between classes, in some embodiments, an algorithm (as described with reference to FIG. 2) was defined and used to increase the density of classes around the median vectors by iteratively moving every vector appropriately towards the class centroid vectors.

However, a challenge faced by the inventors was to perform this type of update simultaneously for all vectors. In order to determine how much a vector should drift, the inventors applied the Bayes Theorem. At each step of the iterative process, the embodiment moved a vector an amount proportionate to its relative affinity to all classes; the higher the affinity, the larger the amount of drift towards a particular class. The inventors also iteratively adjusted the class vector by taking the mean of all the corresponding word vectors (this is similar to a k-means approach). The progression of the algorithm "stops" when the word vectors are close enough, yet have a significant (i.e., sufficient, discernible) distinction from each other. This can be defined such that the cumulative distance of all the vectors from their most affine classes be less than a predefined quantity (epsilon).

In general terms, an embodiment of the system and methods described herein may implement one or more of the following data processing steps or stages:

1. Build and train a machine learning based class "prediction" model:
    1. Tokenize an annotated training corpus and determine the vocabulary;
    2. Generate word vectors for all tokens in the vocabulary;
    3. Iteratively move the word vectors closer to the appropriate classes;
    4. Find an appropriate semantic representation for each document by using the word vectors obtained in the previous step. This representation can be referred to as "Original Document Vectors";
    5. Algorithmically adjust the original document vectors such that they are closer to the pre-labelled classes. This representation can be referred to as "Transformed Document Vectors";
    6. Determine an appropriate transformation to convert an original document vector to a transformed document vector (described with reference to FIG. 4);
2. "Predict" a class for an incoming message or document (such as a customer support issue, request for assistance, product order, technical issue, etc.):
    1. Tokenize the incoming text, message or document, remove the out-of-vocabulary tokens and replace the significant tokens by their corresponding word vectors;
    2. Using the word vectors, generate the incoming document vector by using the document vectorization process (described with reference to FIGS. 1 and 3);
    3. Apply a suitable transformation to the incoming document vector to obtain the transformed document vectors (described with reference to FIG. 4);
    4. Generate a cosine distance-based validation vector of the transformed incoming document vector(s) with each of the class vectors (a cosine similarity measure to find the inclination of the vector towards each of the classes) to obtain a classification score or scores (described with reference to FIG. 5).

In order to build a classification "model" to evaluate a segment of text (or other part of a message) in order to determine (or "predict") a category or classification for that text (or part of a message), an embodiment of the inventive method first looks at historic data and determines a context-based co-occurrence relationship between "tokens" in the text or message. The historic data may be obtained from previously received text or messages and forms a training corpus for the model. The tokens can be unigrams (simple words), bigrams (a legible term that has two words, for example 'conditional probability') or larger size n-grams (a legible term that has n words, where n is a natural number).

Based on the co-occurrence relationship between tokens, in order to preserve the semantic similarity and establish a relation between the occurrence of pair of words with respect to each other, in some embodiments, the system and methods described herein use the concept of Markov weights. In this approach, the word pairs are given importance in accordance to their closeness in grammatically correct sentences. For the kind of corpora where the order of the occurrence of words doesn't matter, an embodiment can use uniform weights for all permutations of word phrase pairs that occur in the same context. Note that the Markovian Weighing scheme is explained in greater detail later in this disclosure. Using the appropriate weighting, an embodiment of the method obtains a degree of correlation between all token pairs. Using this relational data, and the mechanism of Truncated Singular Value Decomposition, an embodiment establishes d-dimensional word vectors for all the tokens, where in comparison to the vocabulary size V, d is a relatively small integer (e.g., 50/100/200 dimensions as compared to a vocabulary of about anywhere between 1500-2000 words for a narrowly focused corpora (data pertaining to only one specific topic like soccer, a particular topic in physics or an app, etc.) and 20000-30000 words for broad spectrum corpora (a sample set of hundred thousand documents from websites like quora, wikipedia, imdb, etc.)). Truncated Singular Value Decomposition also ensures that the correlation bias is removed from the data as only the Principle Components with highest variance are identified and used for construction of word vectors, while redundancy is removed.

Although geometrically a point is a position in a d-dimensional space and a vector indicates direction, representationally, both of these elements may be written as an ordered array of d real numbers, and hence may be used interchangeably. Thus, for two d-dimensional vectors v1 and v2, their convex combination is any point that lies on the line segment joining the two points. Keeping this in mind, an embodiment of the method uses concepts found in convex geometry and Bayesian probability theory to iteratively "drift" an individual word vector towards an orthogonal vector that represents a class or a category. This iterative drifting ensures that all words that are used in a similar context and also are used in the context of a particular class, are projected to a "close" neighborhood of the particular class and thus, close to each other.

The metric used to determine the relative degree of closeness can be any suitable metric, such as Euclidian Distance or Cosine Similarity. For the purpose of some embodiments of the system and methods described herein, the inventors used Euclidian Distance due to the relative ease and efficiency of matrix calculations that this enabled. The iterations may be terminated when the Frobenius Norm of the difference between the vectors before and after an iteration is less than some pre-defined value (epsilon). This iterative process is termed "back-fitting" herein.

Using the word vectors, an embodiment of the method applies certain convolutions and data processing to determine a representation of a document (or documents) in d-dimensions (as described with reference to FIG. 3; note that one could use different semantic representations for words than the one described herein (co-occurrence based embeddings), such as word2vec, GLoVE, BERT, etc). This representation is referred to as the "original" document vectors herein. The method then repeats the back-fitting algorithm or process on the document vectors to get a denser neighborhood around the class vectors. The vectors thus obtained are referred to as "transformed" document vectors (as described with reference to FIG. 1). A mathematical transformation that converts the original document vectors to transformed document vectors is then determined using a Linear Least Square Transformation (as described with reference to FIG. 4).

For a previously unprocessed or unforeseen (that is a new and unclassified) document d1, the method follows the same procedure of tokenization and document vector generation to obtain the original document vector representation for the new document or message. The method then applies the previously obtained transformation to this vector to obtain the transformed document vector which can then be classified on the basis of cosine similarity with the set of orthogonal class (text or message category) vectors. The method typically uses a cosine similarity measure, as it wants to find the inclination of the vector towards all the classes and cosine similarity appropriately determines that aspect. Note that instead of Cosine similarity, one could use the Euclidian distance as a similarity measure, particularly for semantic spaces like word2vec, which focus on distance rather than inclination. This process of classifying a new document is described in greater detail with reference to FIG. 5.

FIG. 1 is a flowchart or flow diagram illustrating a process, method, operation or function for training a text-classification engine (or model) and that may be used in implementing an embodiment of the systems and methods described herein. In some embodiments, the flowchart illustrates a process or portions of a process for constructing and training a "model" that may be used to "predict" the class to which an example of input text (typically in the form of what is termed a document herein) is most likely to belong. Note that some of the same general processing steps are utilized for both processing elements of a corpus of training text and for using the model to classify a "new" previously unlabeled example of text, document or segment of a message.

As shown in the diagram (with further details described with reference to FIG. 6), an example implementation of an embodiment may start with the processing of the raw text from a message or document (as noted, this raw text may be from a corpus of text or messages used for purposes of training a model or from "new" text or a message that is desired to be classified by the model). At a high level, the raw text processing involves a combination of tokenizing the vocabulary, constructing a co-occurrence matrix and generating word vectors/embeddings. A set of mutually orthogonal vectors is then constructed, with one such vector being derived for each class C from the corpus of annotated/labeled examples. An iterative back-fitting approach described herein (with reference to FIG. 2) is then used to enhance or increase the contrast between different word vectors and the orthogonal class vectors. This back-fitting process is typically terminated based on a defined stopping criterion that signifies convergence (or sufficient closeness).

As shown in FIG. 1, at step or stage 102 the raw text of a document is input to the processing pipeline. As noted, the collection of all documents used to train an instance of the model is referred to as the corpus. The raw text is pre-processed at step or stage 104. An example of the pre-processing that may be applied to raw text is explained in greater detail with reference to FIG. 6. The list of unique words in the corpus after pre-processing is referred to as the vocabulary.

Step or stage 106 processes the input text (e.g., words, phrases, sentences) and determines all of the skip grams in the corpus. The frequency of occurrence of a token relative to another token, for all tokens in each phrase or sentence, can be weighted according to a weighting scheme. In some embodiments, the frequency of occurrences may be weighted depending on the word/token separation in the sentence using Markov weights (as suggested by step or stage 108):

tokens that appear in the same sentence directly next to each other are given a weight of $\alpha$;
tokens that appear in the same sentence with one other token separating them are given a weight of $\alpha^2$;
tokens that appear in the same sentence with two other tokens separating them are given a weight of $\alpha^3$; and
tokens that appear in the same sentence with more than 2 other tokens are not considered for the co-occurrence matrix (this approach reduces the "noise" in terms of a semantic similarity measure).

Here $\alpha$ is a predefined hyper parameter of the model, such that $\alpha \in (0,1)$. A general choice of this weight in some embodiments is taken to be α=0.5. For a corpus that contains structured sentences and a high degree of ordering, a lower weight may be desirable. This approach causes word pairs to be weighed according to their closeness in sentences. This also helps in reducing noise in the word vectors. For a corpus with a high degree of noise and unstructured language, a higher weight value may be preferred, as the order in which the words appear is of less importance than that words appear together in the same sentence.

Next, the process constructs a co-occurrence matrix, as suggested by step or stage 110; the matrix is of dimension V×V, where V is the size of the vocabulary. In order to reduce dimensionality and hence improve computational efficiency, at step or stage 112 Principle Component Analysis (PCA) using Truncated Singular Value Decomposition (SVD) may be applied to the co-occurrence matrix. The reduced co-occurrence matrix has a dimension of V×K, where K<V. The rows in the reduced co-occurrence matrix establish a K-dimensional word vector for each word in the vocabulary; these word vectors are also referred to as word embeddings.

Step or stage 114 then randomly initializes C number of K-dimensional, mutually orthogonal vectors, where C is the number of classes in the model. Step or stage 116 represents the frequency of occurrence of a word in a class as a matrix A with dimension V×C. Step or stage 116 also represents the document frequency distribution over classes as a vector B of dimension C. Matrix A and Vector B represent, respectively, the probability of a word being found in a particular class/topic and the probability of a document belonging to a particular class/topic for the corpus of examined documents (vector B can also be described as a vector that represents the distribution of the corpus over all the topics, i.e., the proportion of issues that belong to each topic). Both A and B are used as parameters of a Bayesian Model.

A back-fitting algorithm is applied in step or stage 118 to iteratively increase the "contrast" between the word embedding vectors assigned to different classes. In one embodiment, the back-fitting process takes the word embedding vectors from step or stage 112 and based on the matrix A and the vector B determined at step or stage 116, "moves" the embedding vectors closer to the orthogonal class vectors generated at step or stage 114. This movement is by a small but finite amount and is proportional to the prior class probabilities, and is performed until a user defined stopping criterion is achieved. One example embodiment of the back-fitting method that may be applied at 118 is described in greater detail with reference to FIG. 2.

The resulting "moved" or drifted word embedding vectors of a document are then combined into document embedding vectors (as suggested by step or stage 120). This document vectorization process, which produces the "original" document vectors, is described in greater detail with reference to FIG. 3.

As described with reference to FIG. 3, using the sentence level sequence of tokens, the process generates trigrams for all tokens in a document. Trigrams are used to provide the context of a word and its neighboring words, reinforcing the generated word vectors using the Markovian Weighing Process (which may be replaced by another weighting approach in some use cases). The process averages the word vectors corresponding to each trigram, with the resulting vectors being referred to as triple vectors. Using the list of all such triple vectors in a document, the process performs three operations:

- max-pooling, i.e., choosing the maximum value corresponding to each dimension for all vectors in the list. Using this operation, the process obtains a new vector, $v_{max}$;
- min-pooling, i.e., choosing the minimum value corresponding to each dimension for all vectors in the list. Using this operation, the process obtains a new vector $v_{min}$;
- mean vectorization, i.e., calculating a mean vector for all of the vectors in the list. Using this operation, the process obtains a new vector $v_{mean}$;

The vector formed by concatenating the three vector vectors $v_{max}$, $v_{min}$, $v_{mean}$ is referred to as the "original" document vector for a specific document (as suggested by step or stage 120). The vector can, however be also formed by using any permutation of the three vectors.

Figure 2:
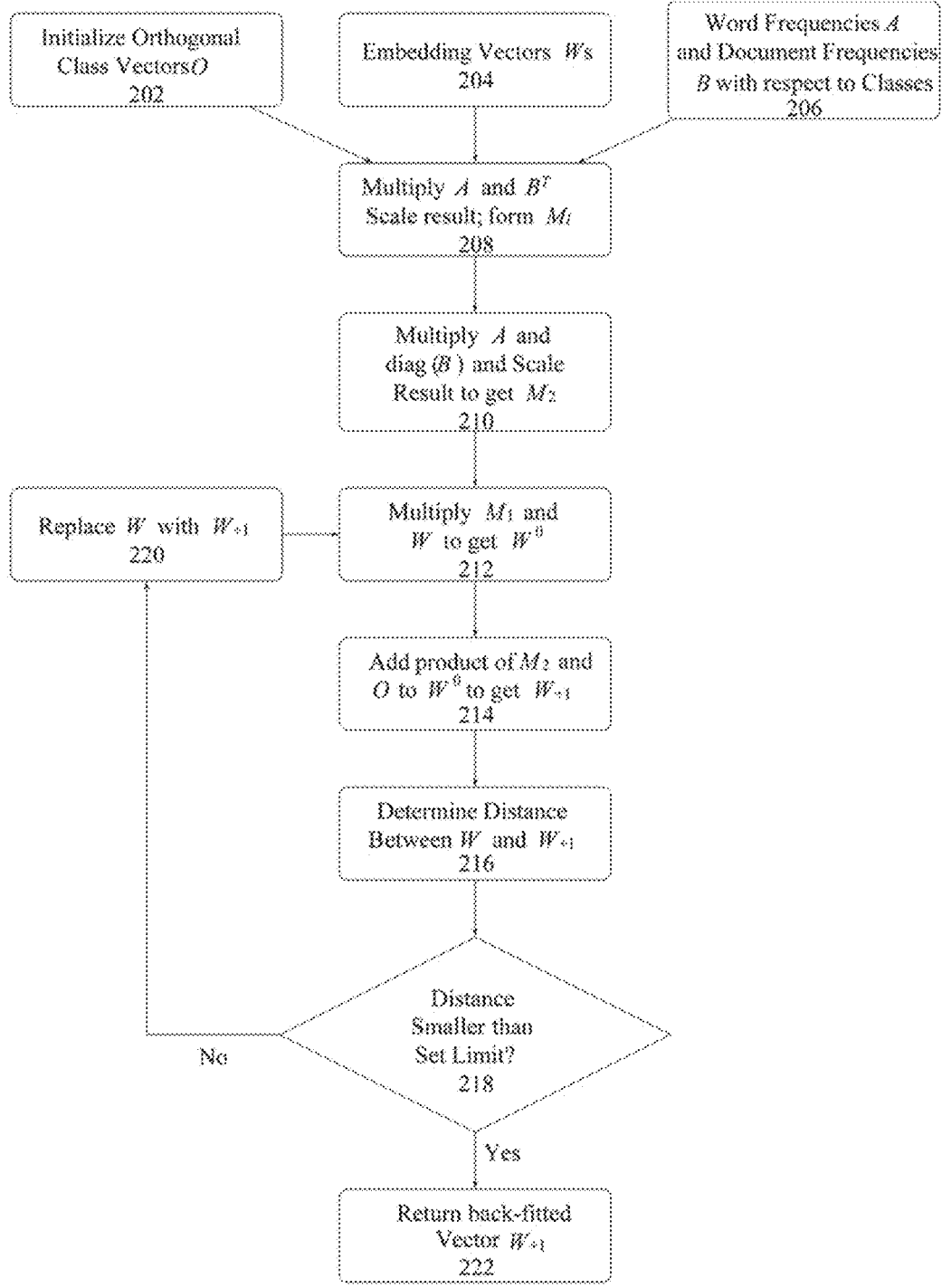
FIG. 2 is a more detailed flowchart or flow diagram illustrating a process, method, operation or function for performing the back-fitting approach mentioned with reference to FIG. 1.

The back-fitting algorithm of FIG. 2 is then applied once again, this time to the original document vectors (as suggested by step or stage 122). The result of the document vector back-fitting process is a set of transformed document vectors (as suggested by step or stage 124).

For a training corpus of N documents with c labels, the matrix A in the case of document vectors is an N×c matrix that represents a probability distribution of a document over the labels, i.e., the probability of a document belonging to a particular label. This distribution can be obtained by use of an unsupervised learning algorithm, where the relative weights for each topic (given a particular document) are a measure of a relative distance from the topic "centers". For a supervised set where every document belongs to exactly one label, the distribution weights are one (1) for the correct label and zero (0) for the other labels. The vector B is a vector that represents the distribution of the corpus over all the topics, i.e., the proportion of issues that belong to each topic. The matrix (A) and vector (B) are used to calculate the Bayesian probability of a topic given a particular document, and accordingly to determine the amount a document needs to be "drifted" towards a topic.

As noted, FIG. 2 is a more detailed flowchart or flow diagram illustrating a process, method, operation or function for performing the back-fitting approach mentioned with reference to FIG. 1. As shown, inputs to the back-fitting algorithm or process are the orthogonal class vectors O (step or stage 202), the embedding vectors (step or stage 204), and the word and document frequencies with respect to the classes, matrix A and vector 8, respectively (step or stage 206). At step or stage 208, A and $B^T$ are multiplied. The resulting product may be understood as the probability of the sample text (e.g., word, phrase, sentence, etc.) occurring in the corpus. Next, the result is scaled by a user-defined value (γ). Here γ is a scaling factor used in order to avoid overshooting the convergence condition. It can either be defined using a grid search or can be a user defined parameter. It has been observed that γ=1 for word vs. topic probability matrix, and γ=0.1×number of documents for document vs. topic matrix, where these values result in better convergence. Subtracting from one produces a vector $M_1$, which gives a measure of the words occurring in the corpus, where $M_1=1-[(A\times B)\cdot\gamma]$.

Next, the process multiplies A with a diagonal matrix that has entries equal to B to give the probability of a sample occurring in a particular class (step or stage 210). Scaling the result of this multiplication by γ yields a matrix $M_2$, which gives a measure of a word occurring in the different classes given the priors of the classes. This is a consequence of the Bayes Theorem. The probability of a label given a word is proportional to the probability of the word given a label times the probability of the label. The matrix operation accomplishes this objective for every word in one step, where $M_2=[A \times diag(B)] \cdot \gamma$.

The product of a diagonal matrix formed using elements of $M_1$ and the embedding vectors W (step or stage 212) gives $W^0$, a Bayesian weighted matrix of all vectors W. Adding the product of $M_2$ and the orthogonal class vectors (step or stage 214) to $W^0$ "boosts" the measure that the token occurs, and yields $W_{+1}$. This represents using Bayesian Inference and Convex combination of vectors so that each vector is moved an amount proportional to its association or affinity to all of the classes. The Frobenius Norm distance between W and $W_{+1}$ (step or stage 216) establishes a measure of the amount the new embedding vectors have been "moved" compared to the embedding vector of the previous iteration. The operations outlined are repeated (i.e., replace W with W+1 as input, at step or stage 220) until the norm distance becomes smaller than a user defined value (as suggested by step or stage 218), which acts to terminate the iterative process, as suggested by the relationships below:

$$W^1 = M_1 \times W$$

$$W_{+1} = W^1 + [M_2 \times O]$$

$$\epsilon = \|W_{+1} - W\|$$

Upon termination of the iteration loop, the latest version of $W_{+1}$ is returned as the back-fitted embedding vector (step or stage 222).

Figure 3:
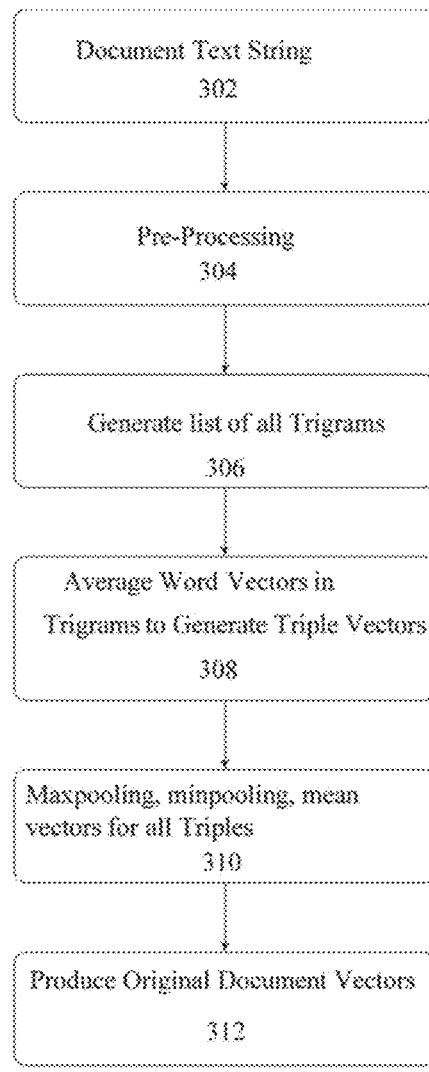
FIG. 3 is a flowchart or flow diagram illustrating a process, method, operation or function for performing the document vectorization approach mentioned with reference to FIG. 1, as applied to the document vectors.

As noted, FIG. 3 is a flowchart or flow diagram illustrating a process, method, operation or function for performing the document vectorization operation mentioned with reference to FIG. 1 (as indicated by step or stage 120), and is applied to a document to produce an original document vector. At step or stage 302 the raw text of the document is input. The raw text is pre-processed at step or stage 304 in accordance with the pre-processing described with reference to FIG. 6.

The word embedding vectors generated from the document are then combined into document embedding vectors. As described previously, using the sentence level sequence of tokens, the process generates trigrams for all tokens in a document (step or stage 306). The process averages the word vectors corresponding to each trigram, with the resulting vectors being referred to as triple vectors (step or stage 308). Using the list of all such triple vectors in a document, the process performs three operations (step or stage 310):
- max-pooling, i.e., choosing the maximum value corresponding to each dimension for all vectors in the list. Using this operation, the process obtains a new vector, $v_{max}$;
- min-pooling, i.e., choosing the minimum value corresponding to each dimension for all vectors in the list. Using this operation, the process obtains a new vector $v_{min}$;
- mean vectorization, i.e., calculating a mean vector for all of the vectors in the list. Using this operation, the process obtains a new vector $v_{mean}$;

The vector formed by concatenating the three vector vectors $v_{max}$, $v_{min}$, $v_{mean}$ is referred to as the "original" document vector for a specific document (as suggested by step or stage 312).

Figure 4:
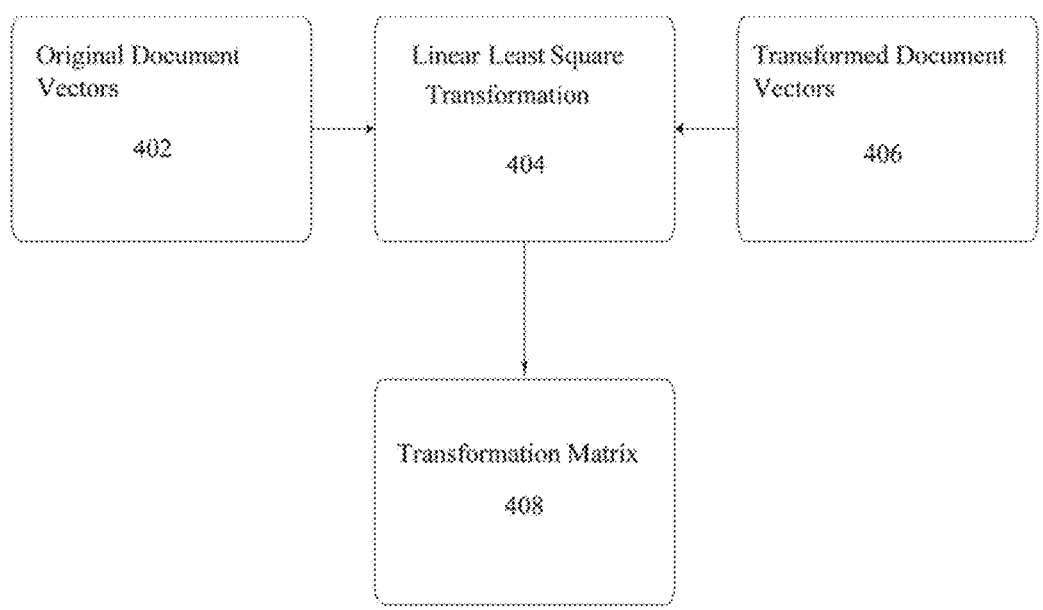
FIG. 4 is a flowchart or flow diagram illustrating a process, method, operation or function for generating a transformation matrix representing a transformation from the original document vectors to the transformed document vectors.

FIG. 4 is a flowchart or flow diagram illustrating a process, method, operation or function for generating a transformation matrix representing a transformation from the original document vectors to the transformed document vectors. As suggested by the figure, using the original document vectors (step or stage 402) generated at step or stage 120 of FIG. 1 and the transformed document vectors (step or stage 406) generated at step or stage 124, the process performs a linear least square transformation (step or stage 404) to obtain a transformation matrix from the original space to the transformed space (step or stage 408).

Figure 5:
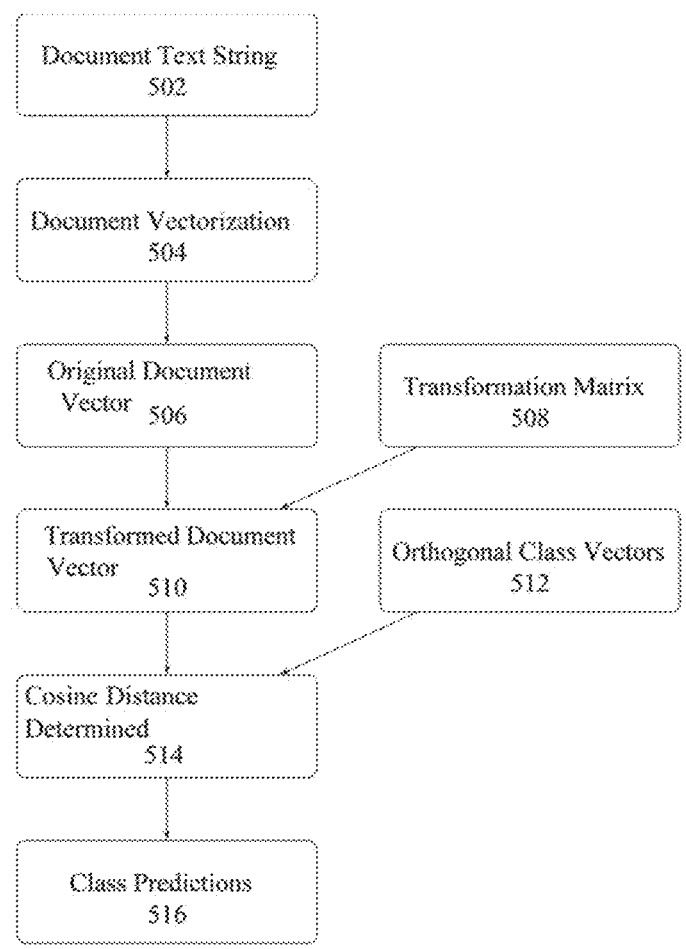
FIG. 5 is a flowchart or flow diagram illustrating a process, method, operation or function for generating a transformed document vector using the transformation matrix generated using the method or process of FIG. 4, followed by generating class prediction scores for the document vector.

FIG. 5 is a flowchart or flow diagram illustrating a process, method, operation or function for generating a transformed document vector and ultimately a classification for a previously unseen document. This is a process flow for identifying classes for new documents which the processes described herein have not seen previously, and illustrates how the model is setup in order to make predictions in production or validation.

Note the process illustrated in FIG. 1 is used to generate vectors for training, and the process illustrated in FIG. 4 generates the transformations that need to be applied at the time of production (i.e., applying the trained model to new text or documents). The generated transformations are applied to new (previously unseen or processed) documents to project them onto the same space as the training data and then make predictions using an affinity measure (such as cosine distance). This uses the transformation matrix generated by the method or process of FIG. 4, followed by generating class prediction scores for the transformed document vector.

As suggested by the figure, at step or stage 502, the raw text of the document is input. The raw text is vectorized at step or stage 504 (as described with reference to FIGS. 3 and 6). The obtained original document vector (step or stage 506) is then multiplied by the transformation matrix (step or stage 508) to obtain the transformed document vector (step or stage 510). Next, the process determines the cosine distance between the orthogonal class vectors (step or stage 512) and the transformed document vector (step or stage 510) at step or stage 514 to obtain class prediction scores for the corresponding documents with respect to the classes (step or stage 516). Step or stage 516 provides as an output the name or label of the most likely class based on the relative affinity of the document to all of the classes (i.e., the name of the class which is "closest" to the document by the measure of Cosine Distance or other applied metric, is given as the output of 516).

Figure 6:
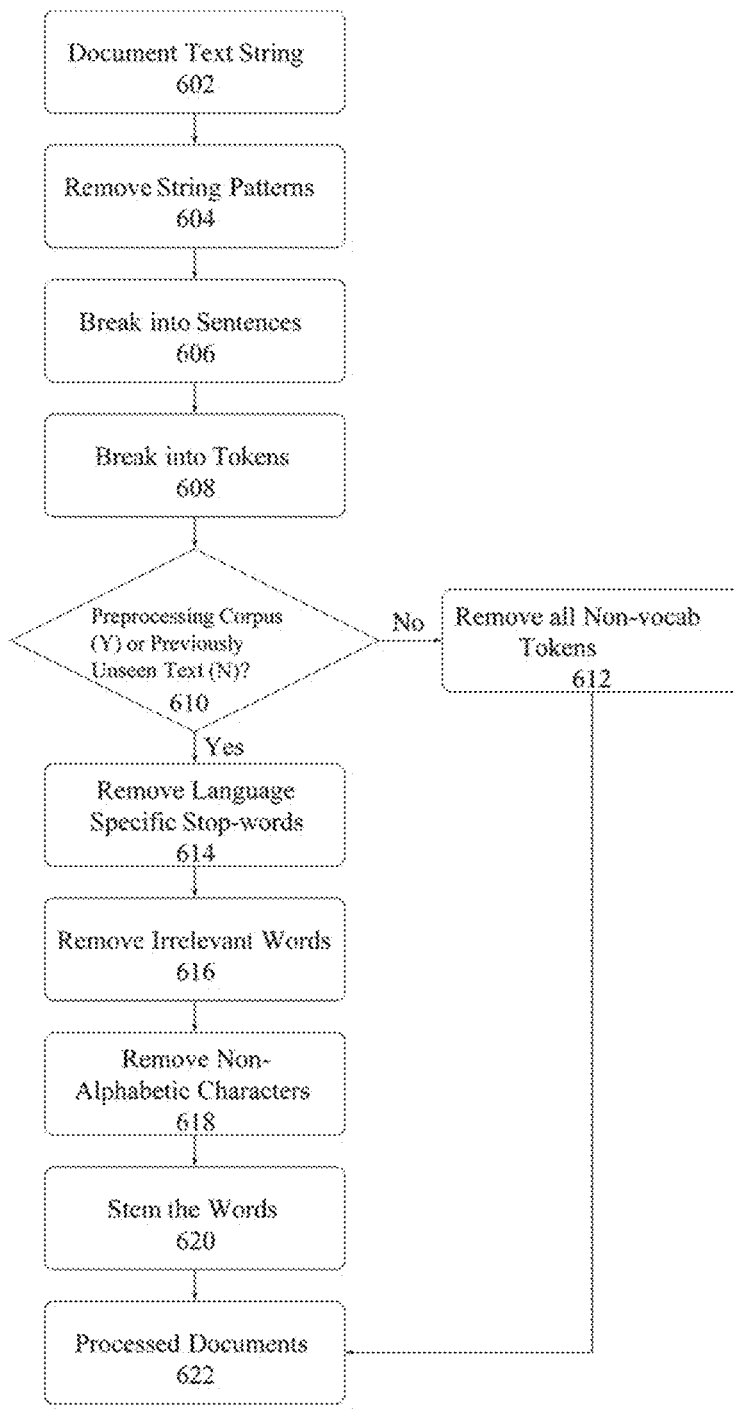
FIG. 6 is a flowchart or flow diagram illustrating a process, method, operation or function for pre-processing a corpus of text prior to further processing.

FIG. 6 is a flowchart or flow diagram illustrating a process, method, operation or function for pre-processing a corpus of text or for processing new text prior to further processing and classification. During pre-processing of the corpus (or other sample of text or a message), the process removes string patterns such as html tags, URLs, numbers, emails, emojis, etc. (as suggested by step or stage 604) from the incoming text segments or documents (step or stage 602). The process then breaks the document into sentences at step or stage 606 and tokenizes the document into "words" at step or stage 608.

At step or stage 610, the processing logic flow changes depending upon whether the training corpus is being processed (in which case the (Y) branch causes the processing to continue to step or stage 614) or a new document or text segment is being processed ((in which case the (N) branch causes the processing to continue to step or stage 612). If the (Y) branch is selected, then the process removes stop words based on a language-dependent reference list at step or stage 614 and removes words with low term frequency and single characters at step or stage 616 (i.e., words unlikely to be common enough to be reliably used for purposes of classification, unimportant or non-distinguishing words). Next, non-alphabetic characters are removed at step or stage 618, followed by stemming at step or stage 620 to obtain the vocabulary of the corpus and the tokenized documents at step or stage 622.

As described, if a corpus is being processed, then the processing logic flows from step or stage 610 to step or stage 614. However, if a new document or set of text that is not in the corpus is being processed, then the processing logic flows from step or stage 610 to step or stage 612. At step or stage 612 the processing removes all the non-vocabulary words from the document, resulting in the tokenized "new" document at step or stage 622.

In general, an embodiment of the invention may be implemented using a set of software instructions that are designed to be executed by a suitably programmed processing element (such as a CPU, GPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

Note that the methods, processes, function or operations described with reference to FIGS. 1-6 may be implemented as a service for one or more users or sets of users. In some embodiments, this service may be provided through the use of a service platform which is operable to provide text or message classification services for multiple customers, with each customer having a separate account. Such a platform may have an architecture similar to a multi-tenant platform or system, which may be referred to as a SaaS (Software-as-a-Service) platform. An example architecture of such a platform is described with reference to FIGS. 7(*a*) to 7(*d*).

FIG. 7(*a*) is a diagram illustrating an example system architecture 700 for a service platform that may be used in implementing an embodiment of the systems and methods described herein. In some embodiments, the service platform includes a website (ServicePlatform.com), an API (Restful web service), and other support services. The website operation follows a standard MVC (model-view-controller) architecture:

- Models—model objects are the parts of the application that implement the logic for the application's data domain. Often, model objects retrieve and store model state in a database. For example, a Bill object might retrieve information from a database, operate on it, and then write updated information back to a Bills table in a SQL Server database;
- Views—views are the components that display the application's user interface (UI). Typically, this UI is created from the model data. An example would be an edit view of a Bills table that displays text boxes, drop-down lists, and check boxes based on the current state of a Bill object; and
- Controllers—controllers are the components that handle user interaction, work with the model, and ultimately select a view to render that displays UI. In an MVC application, the view only displays information; the controller handles and responds to user input and interaction. For example, the controller handles query-string values, and passes these values to the model, which in turn might use these values to query the database.

In one embodiment, the Serviceplatform.com (element, component, or process 702) is based on a standard MVC architecture, and its controller utilizes the API web service (element, component, or process 704) to interact with the service processes and resources (such as models, classification engines or data) indirectly. The API web service is composed of web service modules (element, component, or process 708) and one or more that may execute an embodiment of the process(es) or functionality disclosed herein, that is a text or message classification service module (element, component, or process 710). When receiving a request, either directly from a service user or from the Serviceplatform.com Controller, the web service module (708) reads data from the input, and launches or instantiates the text or message classification service module (710). Both the Web Service Modules 708 and the Text Classification Modules 710 may be (but are not required to be) part of a Web Service Layer 706 of the architecture or platform.

The API Service may be implemented in the form of a standard "Restful" web service, where RESTful web services are a way of providing interoperability between computer systems on the Internet. REST-compliant Web services allow requesting systems to access and manipulate textual representations of Web resources using a uniform and pre-defined set of stateless operations.

As mentioned, an embodiment of the text classification process or processes described with reference to FIGS. 1-6 may be accessed or utilized via either a service platform website 702 or a service platform API 704. The service platform will include one or more processors or other data processing elements, typically implemented as part of a server. The service platform may be implemented as a set of layers or tiers, including a UI layer 720, an application layer 730, a web services layer 706, and a data storage layer 740.

User Interface layer 720 may include one or more user interfaces 722, with each user interface composed of one or more user interface elements 724. Examples of such user interfaces include graphical user interfaces and application programming interfaces (APIs). Each user interface may include one or more interface elements. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

Application layer 730 is typically composed of one or more application modules 732, with each application module composed of one or more sub-modules 734. As described herein, each sub-module may represent executable software instructions or code that when executed by a programmed processor, implements a specific function or process, such as those described with reference to FIGS. 1-6.

As mentioned, the application layer 730 may include one or more application modules 732, each having one or more sub-modules 734. Each application module 732 or sub-module 734 may correspond to a particular function, method, process, or operation that is implemented by the module or sub-module (e.g., a function or process related to providing text or message classification, ERP, CRM, eCommerce or other functionality to a user of the platform). Such function, method, process, or operation may thus include those used to implement one or more aspects of the inventive system and methods, such as by:

- constructing a "predictive model" that can be used to classify or otherwise evaluate a document or word vector based on a training process using a corpus of previously processed (e.g., annotated, classified, or labeled) text;

pre-processing selected text in a new message/document;

forming word vectors from the selected text in the new message/document;

combining the formed word vectors into a document vector;

transforming the formed document vector using a transformation matrix derived from the trained model;

determining a value for a metric representing the "closeness" of the transformed document or word vector to a specific category or classification of document or word vectors; and based on the value of the metric, identifying the most likely category or classification of the evaluated document or word vector.

Note that in some use cases, following the identification of the most likely category or classification of the evaluated document or word vector, a system may initiate an event, alert, or action based at least in part on the classification. Such an event, alert, or action may include, but is not limited to:

Automatic Routing of incoming issue tickets to a sufficiently skilled agent. Without a classification engine such as that described herein, this action is performed manually;

Robotic Process Automation and triggering appropriate bots that can handle the problem without human intervention. The triggering event requires intent identification which requires sophisticated models and accurate classification;

Reporting and bucketing of issues on the basis of their appropriate categories. This can be done more efficiently with automated classification/labelling, while the current approaches require human efforts; and Identification of emerging trends in the issue volumes, types, etc.

Web service layer 706 may be composed of one or more web service modules 708, again with each module including one or more sub-modules (and with each sub-module representing executable instructions that when executed by a programmed processor, implement a specific function or process). For example, web service modules 708 may include modules or sub-modules used to provide support services (as suggested by support service-modules 712) and to provide some (or all) of the functionality associated with the text or message classification service and processes described herein (as suggested by Text Classification Service Modules 710 and/or by Application Modules 732). Thus, in some embodiments, modules 710 and/or 732 may include software instructions that, when executed, implement one or more of the functions described with reference to FIGS. 1-6.

Data storage layer 740 may include one or more data objects 742, with each data object composed of one or more object components 744, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

The architecture of FIG. 7(*a*) is an example of a multi-tenant architecture which may be used to provide access to users to various data stores and executable applications or functionality (sometimes referred to as providing Software-as-a-Service (SaaS)). Although FIG. 7(*a*) and its accompanying description are focused on a service platform for providing the functionality associated with the text or message classification processes described with reference to FIGS. 1-6, note that a more generalized form of a multi-tenant platform may be used that includes the capability to provide other services or functionality. For example, the service provider may also provide a user with the ability to conduct certain data analysis, billing, account maintenance, scheduling, remotely performed system or product diagnosis, remotely activated repair activities (such as a system reset), eCommerce, ERP functionality, CRM functionality, etc.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server may include each application module. Alternatively, different application servers may include different sets of application modules. Such sets may be disjoint or overlapping.

More generally, with regards to FIGS. 7(*a*) to 7(*d*), it is noted that modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

The ability of business users to access crucial business information has been greatly enhanced by the proliferation of IP-based networking together with advances in object-oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level.

In a related development, substantial efforts have also been directed to integrated Customer Relationship Management (CRM) systems, with a view toward obtaining a better understanding of customers, enhancing service to existing customers, and acquiring new and profitable customers.

FIG. 7(*b*) is a diagram illustrating a system 750, including an integrated business system 752 and an enterprise network 754 in which an embodiment of the invention may be implemented. Enterprise network 754 may be associated with a business enterprise, such as a retailer, merchant, service provider, or other type of business. Alternatively, and in accordance with the advantages of an application service provider (ASP) hosted integrated business system (such as a multi-tenant data processing platform), the business enterprise may comprise fewer or no dedicated facilities or business network at all, provided that its end users have access to an internet browser and an internet connection. For simplicity and clarity of explanation, the enterprise network 754 is represented by an on-site local area network 756 to which a plurality of personal computers are connected, each generally dedicated to a particular end user (although such dedication is not required), along with an exemplary remote user computer that can be, for example, a laptop computer or tablet computer of a traveling employee having internet access through a hotel, coffee shop, a public Wi-Fi access point, or other internet access method. The end users associated with computers and may also (or instead) possess an internet-enabled smartphone or other electronic device (such as a PDA) having wireless internet access or other synchronization capabilities. Users of the enterprise network 754 interface with the integrated business system 752 across the Internet 758 or another suitable communications network or combination of networks.

Integrated business system 752, which may be hosted by a dedicated third party, may include an integrated business server 760 and a web interface server 762, coupled as shown in the figure. It is to be appreciated that either or both of the integrated business server 760 and the web interface server 762 may be implemented on one or more different hardware systems and components, even though represented as singular units in FIG. 7(b). In one embodiment, integrated business server 760 comprises an ERP module 764 and further comprises a CRM module 766. In many cases, it will be desirable for the ERP module 764 to share methods, libraries, databases, subroutines, variables, etc., with CRM module 766, and indeed ERP module 764 may be intertwined with CRM module 766 into an integrated Business Data Processing Platform (which may be single tenant but is typically multi-tenant).

The ERP module 764 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 766 may include, but is not limited to, a sales force automation (SFA) module, a marketing automation module, a contact list module (not shown), a call center support module, a web-based customer support module, a reporting and analysis module, and other CRM-related modules. Web interface server 762 is configured and adapted to interface with the integrated business server 760 to provide one or more web-based user interfaces to end users of the enterprise network 754.

Figure 7A:
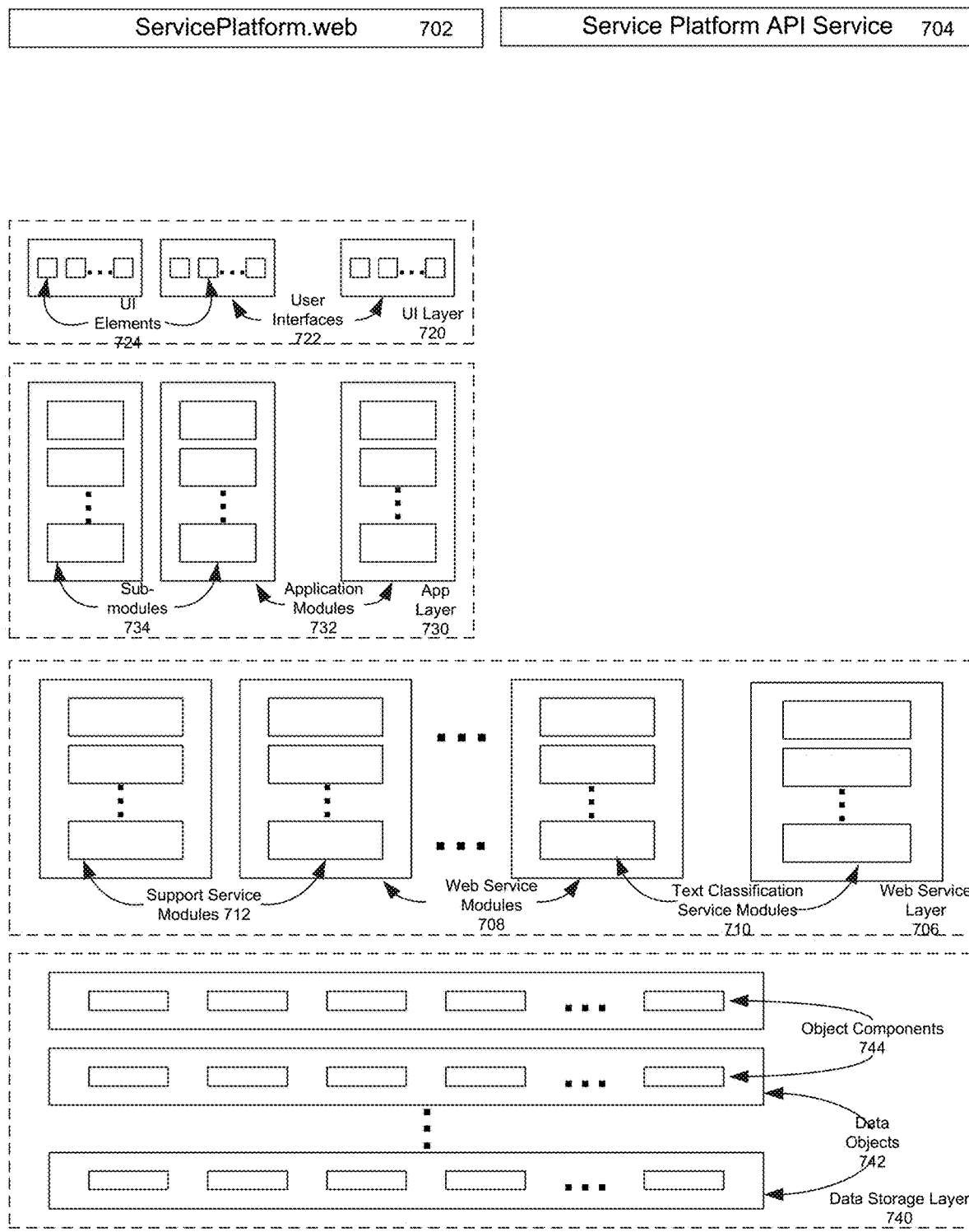
FIGS. 7(a) to 7(d) are diagrams illustrating aspects of a multi-tenant service platform architecture that may be used, in whole or in part, in implementing an embodiment of the systems and methods described herein.
Figure 7B:
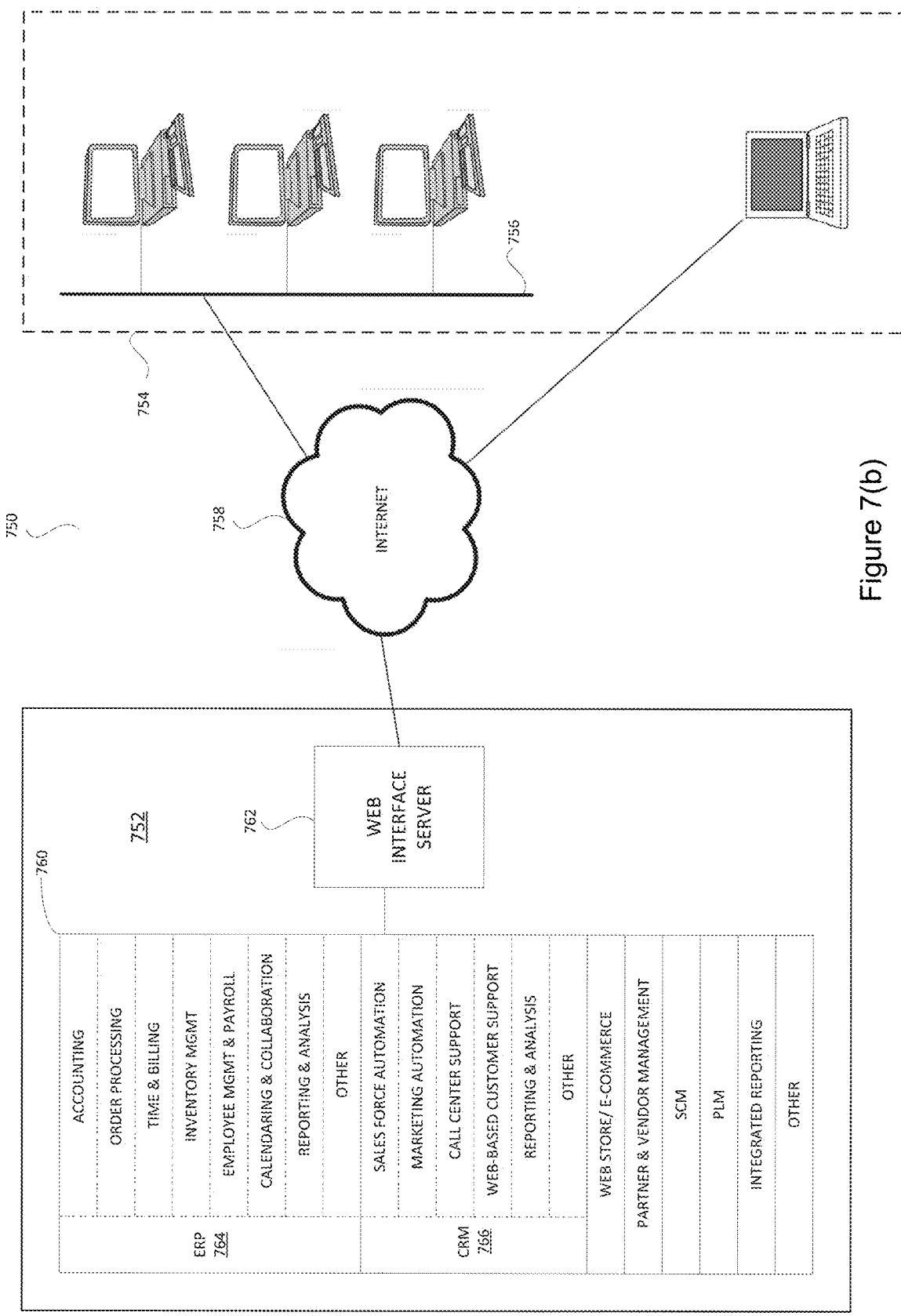

The integrated business system shown in FIG. 7(b) may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 7C:
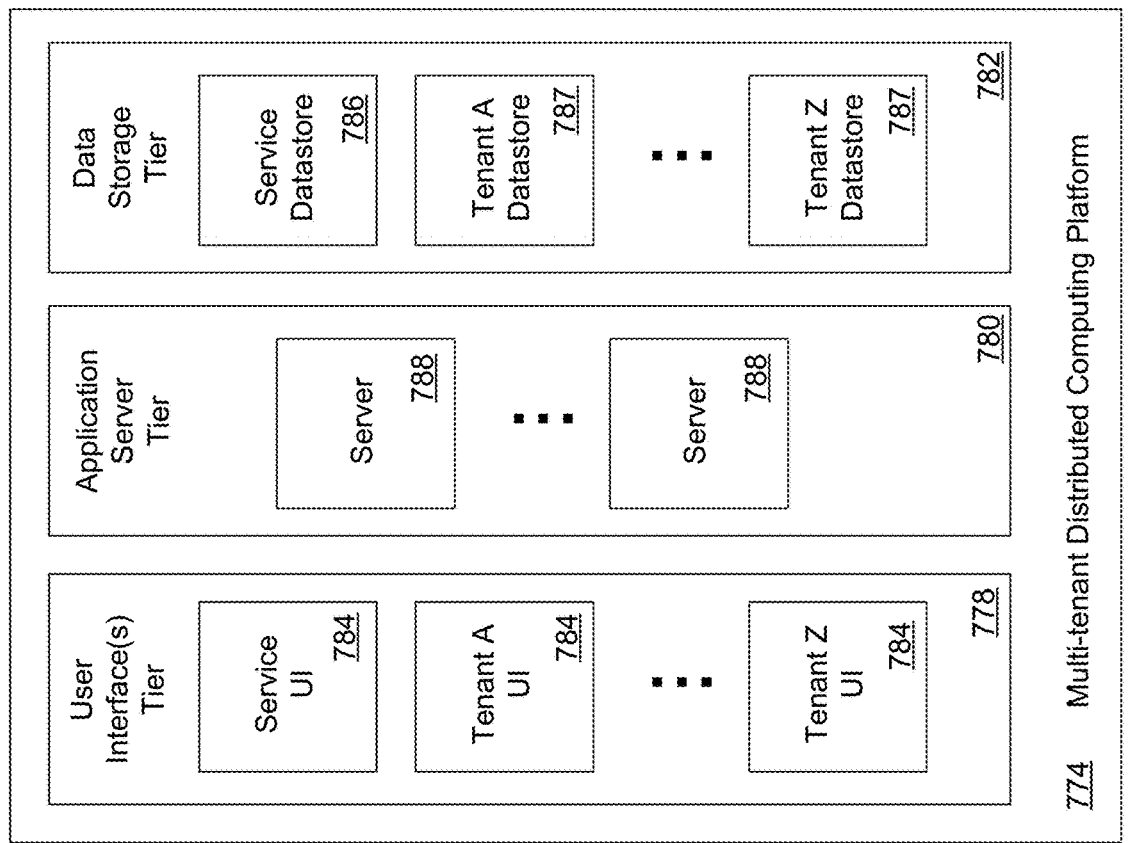
Figure 7C:
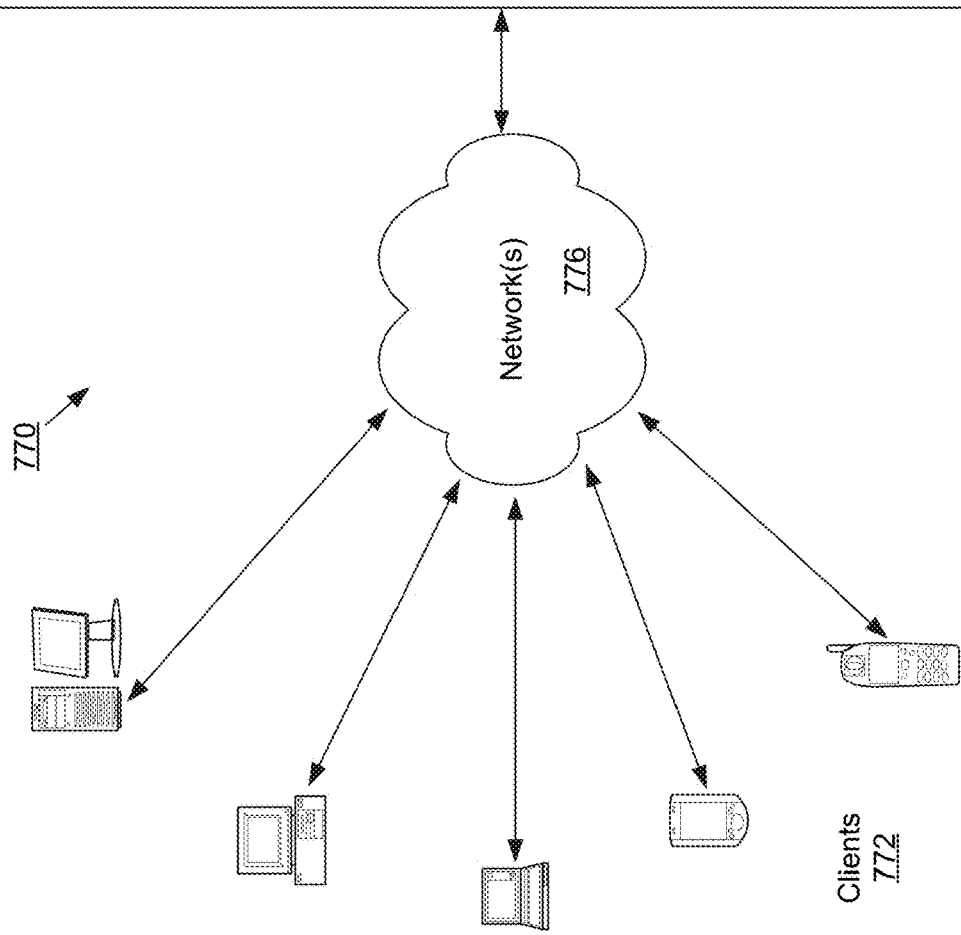

FIG. 7(c) is a diagram illustrating elements or components of an example operating environment 770 in which an embodiment of the invention may be implemented. As shown, a variety of clients 772 incorporating and/or incorporated into a variety of computing devices may communicate with a distributed computing service/platform 774 through one or more networks 776. For example, a client may incorporate and/or be incorporated into a client application (e.g., software) implemented at least in part by one or more of the computing devices. Examples of suitable computing devices include personal computers, server computers, desktop computers, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks 776 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 774 may include multiple processing tiers, including a user interface tier 778, an application server tier 780, and a data storage tier 782. The user interface tier 778 may maintain multiple user interfaces 784, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 782 may include one or more data stores, which may include a Service Data store 786 and one or more Tenant Data stores 787.

Each tenant data store 787 may contain tenant-specific data that is used as part of providing a range of tenant-specific business services or functions, including but not limited to ERP, CRM, eCommerce, Human Resources management, payroll, etc. Data stores may be implemented with any suitable data storage technology, including structured query language (SQL) based relational database management systems (RDBMS).

In accordance with one embodiment of the invention, distributed computing service/platform 774 may be multi-tenant and service platform 774 may be operated by an entity in order to provide multiple tenants with a set of text or message classification services, data storage, and other functionality. These services and functionality may also include ones that a business uses to manage various aspects of its operations. For example, the applications and functionality may include providing web-based access to business information systems, thereby allowing a user with a browser and an Internet or intranet connection to view, enter, process, or modify certain types of business information.

As noted, such business information systems may include an Enterprise Resource Planning (ERP) system that integrates the capabilities of several historically separate business computing systems into a common system, with the intention of streamlining business processes and increasing efficiencies on a business-wide level. Such functions or business applications are typically implemented by one or more modules of software code/instructions that are maintained on and executed by one or more servers 788 that are part of the platform's Application Server Tier 780.

Another business information system that may be provided as part of an integrated data processing and service platform is an integrated Customer Relationship Management (CRM) system, which is designed to assist in obtaining a better understanding of customers, enhance service to existing customers, and assist in acquiring new and profitable customers. Such functions or business applications are typically implemented by one or more modules of software code/instructions that are maintained on and executed by one or more servers 788 that are part of the platform's Application Server Tier 780.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform (such as platform 774).

As noted with regards to FIG. 7(b), the integrated business system shown in FIG. 7(c) may be hosted on a distributed computing system made up of at least one, but typically multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers and the software applications running on the remote computers may be referred to as the "clients."

Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

In some cases, a tenant may desire to modify or supplement the functionality of an existing platform application by introducing an extension to that application, where the extension is to be made available to the tenant's employees and/or customers. In some cases, such an extension may be applied to the processing of the tenant's business-related data that is resident on the platform. The extension may be developed by the tenant or by a $3^{rd}$ party developer and then made available to the tenant for installation. The platform may include a "library" or catalog of available extensions, which can be accessed by a tenant and searched to identify an extension of interest. Software developers may be permitted to "publish" an extension to the library or catalog after appropriate validation of a proposed extension.

Thus, in an effort to permit tenants to obtain the services and functionality that they desire (which may include providing certain services to their end customers, such as functionality associated with an eCommerce platform), a multi-tenant service platform may permit a tenant to configure certain aspects of the available service(s) to better suit their business needs. In this way aspects of the service platform may be customizable, and thereby enable a tenant to configure aspects of the platform to provide distinctive services to their respective users or to groups of those users. For example, a business enterprise that uses the service platform may want to provide additional functions or capabilities to their employees and/or customers, or to cause their business data to be processed in a specific way in accordance with a defined workflow that is tailored to their business needs, etc.

Tenant customizations to the platform may include custom functionality (such as the capability to perform tenant or user-specific functions, data processing, or operations) built on top of lower level operating system functions. Some multi-tenant service platforms may offer the ability to customize functions or operations at a number of different levels of the service platform, from aesthetic modifications to a graphical user interface to providing integration of components and/or entire applications developed by independent third-party vendors. This can be very beneficial, since by permitting use of components and/or applications developed by third party vendors, a multi-tenant service can significantly enhance the functionality available to tenants and increase tenant satisfaction with the platform.

As noted, in addition to user customizations, an independent software developer may create an extension to a particular application that is available to users through a multi-tenant data processing platform. The extension may add new functionality or capabilities to the underlying application. One or more tenants/users of the platform may wish to add the extension to the underlying application in order to be able to utilize the enhancements to the application that are made possible by the extension. Further, the developer may wish to upgrade or provide a patch to the extension as they recognize a need for fixes or additional functionality that would be beneficial to incorporate into the extension. In some cases, the developer may prefer to make the upgrade available to only a select set of users (at least initially) in order to obtain feedback for improving the newer version of the extension, to test the stability of the extension, or to assist them to segment the market for their extension(s).

Figure 7D:
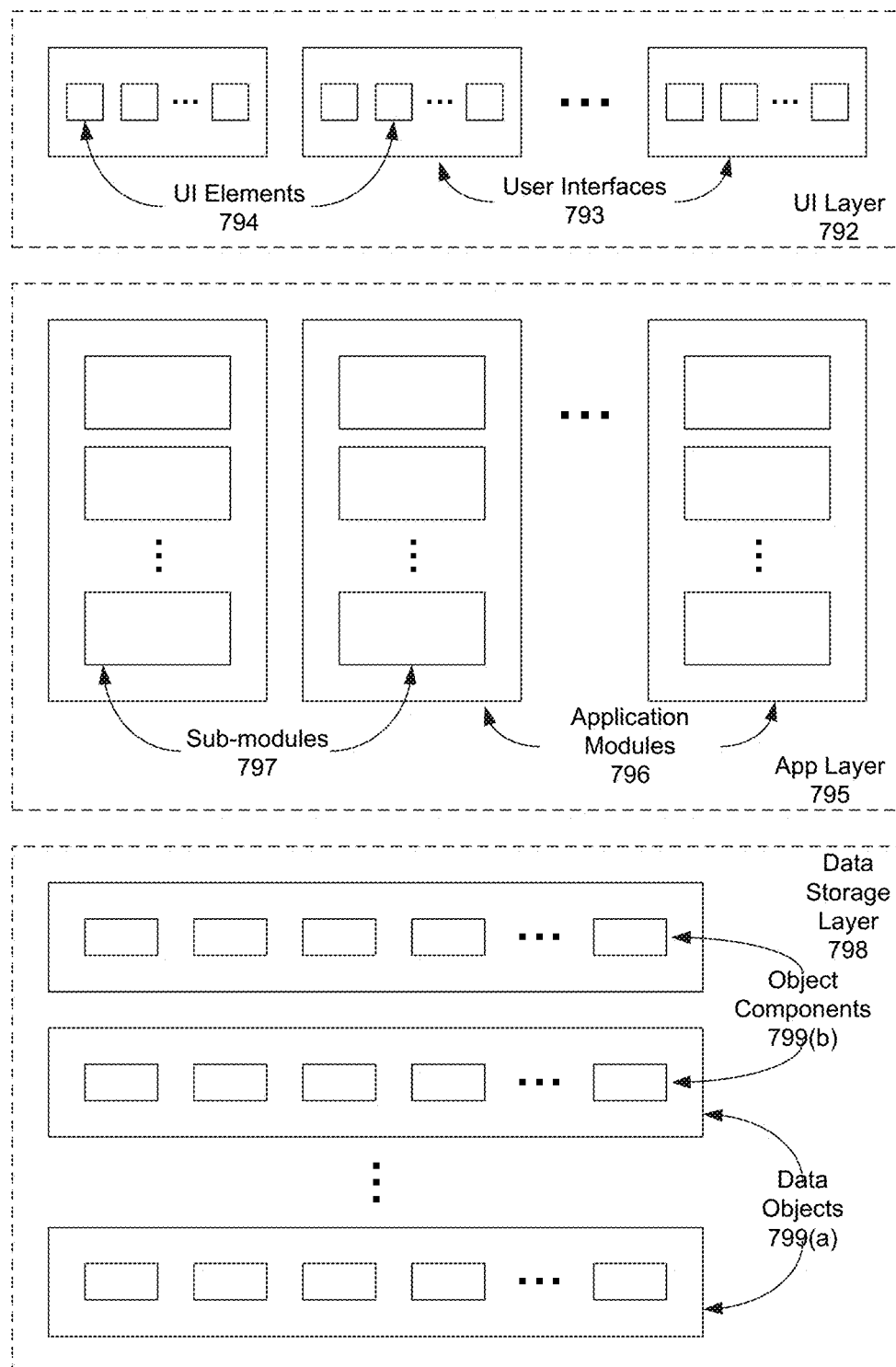

FIG. 7(d) is a diagram illustrating additional details of the elements or components of the multi-tenant distributed computing service platform of FIG. 7(c), in which an embodiment of the invention may be implemented. The software architecture depicted in FIG. 7(d) represents an example of a complex software system to which an embodiment of the invention may be applied. In general, an embodiment of the invention may be implemented using a set of software instructions that are designed to be executed by a suitably programmed processing element (such as a CPU, GPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7(d) is a diagram illustrating additional details of the elements or components 790 of the multi-tenant distributed computing service platform of FIG. 7(c), in which an embodiment of the invention may be implemented. The example architecture includes a user interface layer or tier 792 having one or more user interfaces 793. Examples of such user interfaces include graphical user interfaces and application programming interfaces (APIs). Each user interface may include one or more interface elements 794. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote and may include interface elements such as parameterized procedure calls, programmatic objects and messaging protocols.

The application layer 795 may include one or more application modules 796, each having one or more sub-modules 797. Each application module 796 or sub-module 797 may correspond to a particular function, method, process, or operation that is implemented by the module or sub-module (e.g., a function or process related to providing text or message classification, ERP, CRM, eCommerce or other functionality to a user of the platform). Such function, method, process, or operation may thus include those used to implement one or more aspects of the inventive system and methods, such as by:

constructing a "predictive model" that can be used to classify or otherwise evaluate a document or word vector based on a training process using a corpus of previously processed (e.g., annotated, classified, or labeled) text;
pre-processing selected text in a new message/document;
forming word vectors from the selected text in the new message/document;
combining the formed word vectors into a document vector;
transforming the formed document vector using a transformation matrix derived from the trained model;
determining a value for a metric representing the "closeness" of the transformed document or word vector to a specific category or classification of document or word vectors; and
based on the value of the metric, identifying the most likely category or classification of the evaluated document or word vector.

As noted, in some embodiments, classification of a new document may be followed by routing the document to a specific service agent, initiating an automated process, or otherwise responding to the contents of the document.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server may include each application module. Alternatively, different application servers may include different sets of application modules. Such sets may be disjoint or overlapping.

The data storage layer 798 may include one or more data objects 799(a) each having one or more data object components 799(b), such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 7(a)-7(d) are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network (and in some cases locally). Further example environments in which an embodiment of the invention may be implemented include devices (including mobile devices), software applications, systems, apparatuses, networks, or other configurable components that may be used by multiple users for data entry, data processing, application execution, data review, etc. and which have user interfaces or user interface components that can be configured to present an interface to a user. Although further examples may reference the example computing environment depicted in FIGS. 7(a)-7(d), it will be apparent to one of skill in the art that the examples may be adapted for alternate computing devices, systems, apparatuses, processes, and environments. Note that an embodiment of the inventive methods may be implemented in the form of an application, a sub-routine that is part of a larger application, a "plug-in", an extension to the functionality of a data processing system or platform, or any other suitable form.

Figure 8:
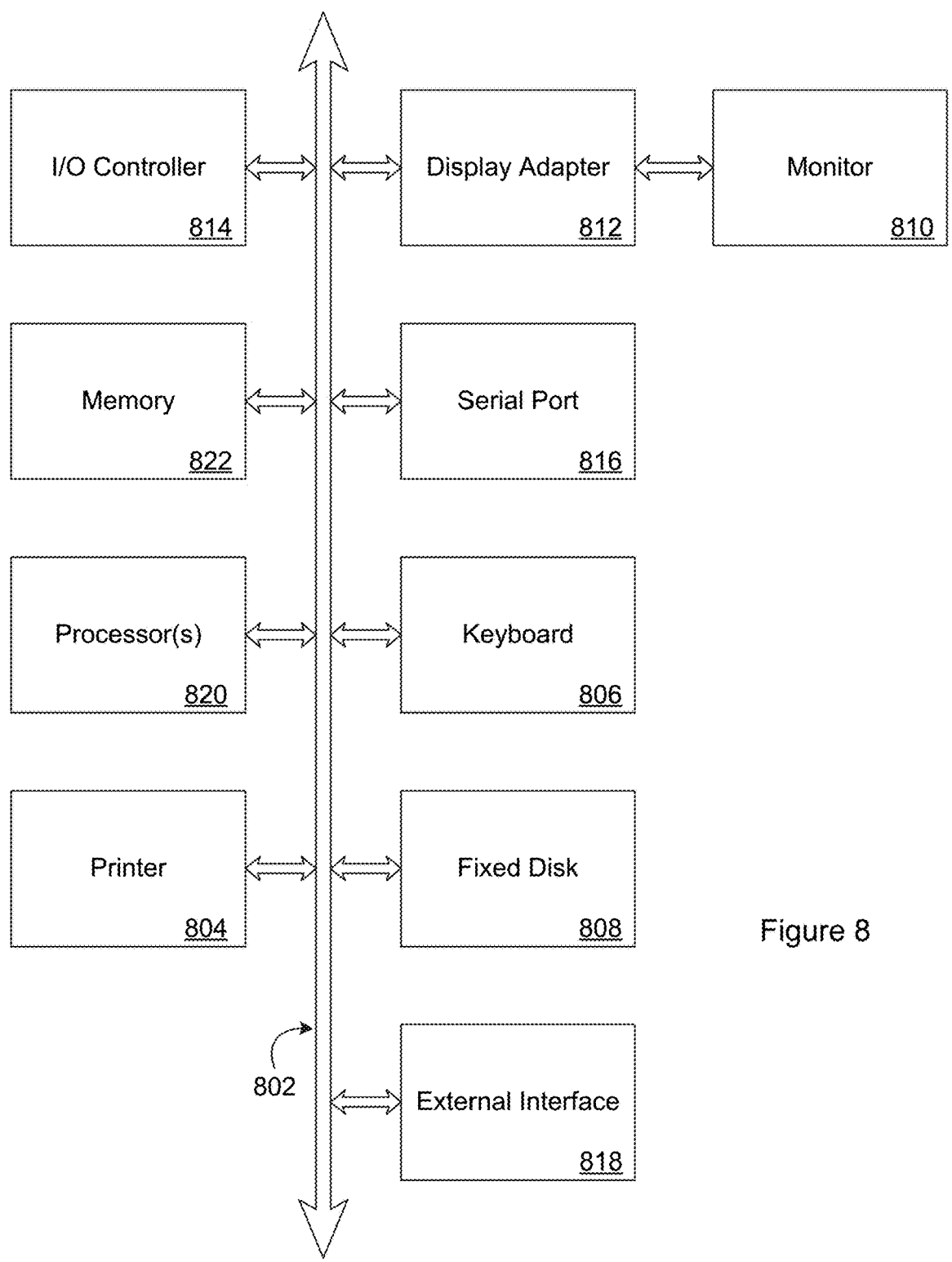
FIG. 8 is a diagram illustrating elements or components that may be present in a computer device or system configured to implement a method, process, function, or operation in accordance with an embodiment of the invention.

FIG. 8 is a diagram illustrating elements or components that may be present in a computer device or system configured to implement a method, process, function, or operation in accordance with an embodiment of the invention. As noted, in some embodiments, the inventive system and methods may be implemented in the form of an apparatus that includes a processing element and set of executable instructions. The executable instructions may be part of a software application and arranged into a software architecture. In general, an embodiment of the invention may be implemented using a set of software instructions that are designed to be executed by a suitably programmed processing element (such as a CPU, GPU (graphics processing unit), microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module (e.g., a function or process related to the operations or functionality of the service platform). Such function, method, process, or operation may include those used to implement one or more aspects of the inventive system, service and methods, such as by:

constructing a "predictive model" that can be used to classify or otherwise evaluate a document or word vector based on a training process using a corpus of previously processed (e.g., annotated, classified, or labeled) text;
pre-processing selected text in a new message/document;
forming word vectors from the selected text in the new message/document;
combining the formed word vectors into a document vector;
transforming the formed document vector using a transformation matrix derived from the trained model;
determining a value for a metric representing the "closeness" of the transformed document or word vector to a specific category or classification of document or word vectors; and
based on the value of the metric, identifying the most likely category or classification of the evaluated document or word vector.

As noted, in some embodiments, classification of a new document may be followed by routing the document to a specific service agent, initiating an automated process, or otherwise responding to the contents of the document.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the system, apparatus, methods, processes, functions, and/or operations for implementing an embodiment of the invention may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 8 is a diagram illustrating elements or components that may be present in a computer device or system 800 configured to implement a method, process, function, or operation in accordance with an embodiment of the invention. The subsystems shown in FIG. 8 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 8 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

In some embodiments, the methods or models described herein may be embodied in the form of a trained neural network, where the network is implemented by the execution of a set of computer-executable instructions. The instructions may be stored in (or on) a non-transitory computer-readable medium and executed by a programmed processor or processing element. The specific form of the method or model may be used to define one or more of the operations, functions, processes, or methods used in the development or operation of a neural network, the application of a machine learning technique or techniques, or the development or implementation of an appropriate decision process. Note that a neural network or deep learning model may be characterized in the form of a data structure in which are stored data representing a set of layers containing nodes, and connections between nodes in different layers are created (or formed) that operate on an input to provide a decision or value as an output.

In general terms, a neural network may be viewed as a system of interconnected artificial "neurons" that exchange messages between each other. The connections have numeric weights that are "tuned" during a training process, so that a properly trained network will respond correctly when presented with an image or pattern to recognize (for example). In this characterization, the network consists of multiple layers of feature-detecting "neurons"; each layer has neurons that respond to different combinations of inputs from the previous layers. Training of a network is performed using a "labeled" dataset of inputs in a wide assortment of representative input patterns that are associated with their intended output response. Training uses general-purpose methods to iteratively determine the weights for intermediate and final feature neurons. In terms of a computational model, each neuron calculates the dot product of inputs and weights, adds the bias, and applies a non-linear trigger or activation function (for example, using a sigmoid response function).

Note that an embodiment of the invention can be used as a part of a neural network, and in some ways or characteristics is a form of neural network, although in an unconventional sense. In this regard, the vector back-fitting process described may be compared to a form of back-propagation technique or approach, while the process of generating word embeddings and document vectors has some similarities to a convolution operation or function.

Any of the software components, processes or functions described in this application may be implemented as software code to be executed by a processor using any suitable computer language such as, for example, Python, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus, and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the invention.

Different arrangements of the components depicted in the drawings or described above, as well as components and steps not shown or described are possible. Similarly, some That which is claimed is:

1. A computer-implemented method for providing a service to customers, comprising:
   storing a set of possible responses to a document received from a customer in an electronic data storage element, wherein each of the possible responses is associated with one or more classifications of the received document;
   receiving a new document from the customer and if needed, converting the new document into a digital representation of the new document;
   converting the digital representation of the new document into a document vector;
   applying a transformation matrix to the document vector to produce a transformed document vector, wherein the transformation matrix is determined by comparing a set of document vectors generated from a corpus of documents to a corresponding set of transformed document vectors, and further, wherein for each document vector in the set of document vectors generated from the corpus, the corresponding transformed document vector is obtained by a back-fitting process of the document vector with respect to a set of mutually orthogonal class vectors, where each of the mutually orthogonal class vectors represent a possible classification of the document and where the back-fitting process includes consideration of the probability of a word appearing in a document given a particular topic and the probability of a document belonging to a topic for the corpus of documents;
   comparing the transformed document vector to the set of mutually orthogonal class vectors, where each of the mutually orthogonal class vectors represent a possible classification of the new document received from the customer;
   based on the comparison, determining a most likely classification for the new document received from the customer;
   determining one of the set of possible responses associated with the most likely classification determined for the new document received from the customer; and
   automatically executing the determined one of the possible responses.

2. The method of claim 1, wherein the new document is a text message, and further, wherein the set of possible responses comprises routing the document to an appropriate human service agent or initiating a predetermined process to respond to the document.

3. The method of claim 1, wherein for each of a set of previously unclassified documents, the method further comprises determining a classification for each of the previously unclassified documents and processing the determined classifications to determine a desired change in an allocation of customer support resources.

4. The method of claim 3, wherein determining a desired change in the allocation of customer support resources comprises one or more of (i) adjusting which agents or queues documents with certain classifications are assigned to, based at least in part on the classification frequency and agent or queue load to minimize wait times, (ii) activation of an alert to a high volume or increase in volume for certain classifications, and (iii) identification of a trend that represents a volume increase or decrease for certain classifications.

5. The method of claim 1, wherein comparing the transformed document vector to the set of mutually orthogonal class vectors further comprises determining a measure of the cosine distance between the transformed document vector and each of the mutually orthogonal class vectors.

6. The method of claim 1, wherein converting the digital representation into a document vector further comprises:
   tokenizing the text in the digital representation of the document to form a set of document tokens;
   reducing the set of document tokens to the significant tokens;
   converting each of the significant tokens into a word vector;
   forming a set of trigrams for all of the significant tokens;
   for each word vector, generating a corresponding transformed word vector by the back-fitting of the word vector with respect to the set of mutually orthogonal class vectors;
   averaging the transformed word vectors for each token in a trigram to form a set of averaged word vectors;
   selecting the word vector of the set of averaged word vectors corresponding to the maximum value, the word vector corresponding to the minimum value, and the word vector corresponding to the mean value; and
   combining the word vector of the set of averaged word vectors corresponding to the maximum value, corresponding to the minimum value, and corresponding to the mean value into the document vector.

7. The method of claim 1, wherein the back-fitting process functions to cluster the original document vectors more closely to the class with which they are most associated.

8. The method of claim 6, further comprising weighting the tokens prior to converting each of the significant tokens into a word vector.

9. The method of claim 8, wherein weighting the tokens further comprises:
   for tokens that appear in the same sentence directly next to each other, apply a weight of a, where a is a number between 0 and 1;
   for tokens that appear in the same sentence with one other token separating them, apply a weight of $a^2$; and
   for tokens that appear in the same sentence with two other tokens separating them, apply a weight of $a^3$.

10. A system providing a service to customers, comprising:
    an electronic processor programmed with a set of computer-executable instructions;
    a non-transitory electronic storage element storing the set of computer-executable instructions, wherein the set of computer-executable instructions further includes:
    computer-executable instructions, which when executed cause the system to store a set of possible responses to a document received from a customer in an electronic data storage element, wherein each of the possible responses is associated with one or more classifications of the received document;
    computer-executable instructions, which when executed cause the system to access a set of documents, wherein each document in the set of documents is associated with a classification;

computer-executable instructions, which when executed cause the system to, for each document in the set of documents, convert text in each document into a set of tokens and to generate a word vector from each significant token;

computer-executable instructions, which when executed cause the system to perform a back-fitting process on each of the generated word vectors with respect to a set of mutually orthogonal class vectors, where each of the mutually orthogonal class vectors represent a possible classification of a document and where the back-fitting process includes consideration of the probability of a word appearing in a document given a particular topic and the probability of a document belonging to a topic for the corpus of documents;

computer-executable instructions, which when executed cause the system to process a result of back-fitting the generated word vectors to produce a set of document vectors, with each document vector in the set corresponding to one of the documents in the accessed set of documents;

computer-executable instructions, which when executed cause the system to perform a back-fitting process on each document vector in the set of document vectors to produce a set of transformed document vectors;

computer-executable instructions, which when executed cause the system to determine a transformation between the set of document vectors and the set of transformed document vectors;

computer-executable instructions, which when executed cause the system to access a digital representation of a new document received from a customer not in the set of documents;

computer-executable instructions, which when executed cause the system to convert the digital representation of the new document into a document vector;

computer-executable instructions, which when executed cause the system to apply the determined transformation to the document vector to produce a transformed document vector;

computer-executable instructions, which when executed cause the system to compare the transformed document vector to the set of mutually orthogonal class vectors;

computer-executable instructions, which when executed cause the system to determine a most likely classification for the new document based on the comparison;

computer-executable instructions, which when executed cause the system to determine one of the set of possible responses associated with the most likely classification determined for the new document; and computer-executable instructions which when executed cause the system to automatically execute the determined one of the possible responses.

11. The system of claim 10, wherein the new document is a text message, further wherein the set of possible responses comprises routing the document to an appropriate human service agent or initiating a predetermined process to respond to the document.

12. The system of claim 10, wherein the system includes computer-executable instructions for determining a classification for each of a set of previously unclassified documents and processing the determined classifications to determine a desired change in an allocation of customer support resources.

13. The system of claim 12, wherein determining a desired change in the allocation of customer support resources comprises one or more of (i) adjusting which agents or queues documents with certain classifications are assigned to, based at least in part on the classification frequency and agent or queue load to minimize wait times, (ii) activation of an alert to a high volume or increase in volume for certain classifications, and (iii) identification of a trend that represents a volume increase or decrease for certain classifications.

14. The system of claim 10, wherein comparing the transformed document vector to the set of mutually orthogonal class vectors further comprises determining a measure of the cosine distance between the transformed document vector and each of the mutually orthogonal class vectors.

15. The system of claim 10, wherein converting the digital representation of a document not in the set of documents into a document vector further comprises:
tokenizing the text in the digital representation of the document to form a set of document tokens;
reducing the set of document tokens to the significant tokens;
converting each of the significant tokens into a word vector;
forming a set of trigrams for all of the significant tokens;
for each word vector, generating a corresponding transformed word vector by the back-fitting of the word vector with respect to the set of mutually orthogonal class vectors;
averaging the transformed word vectors for each token in a trigram to form a set of averaged word vectors;
selecting the word vector of the set of averaged word vectors corresponding to the maximum value, the word vector corresponding to the minimum value, and the word vector corresponding to the mean value; and
combining the word vector of the set of averaged word vectors corresponding to the maximum value, corresponding to the minimum value, and corresponding to the mean value into the document vector.

16. The system of claim 10, wherein the back-fitting process functions to cluster the original document vectors more closely to the class with which they are most associated.

17. A set of one or more non-transitory computer-readable mediums comprising instructions which, when executed by one or more computing devices, cause the computing devices to:
access a set of documents, wherein each document in the set of documents is associated with a classification;
for each document in the set of documents, convert text in each document into a set of tokens and to generate a word vector from each significant token;
perform a back-fitting process on each of the generated word vectors with respect to a set of mutually orthogonal class vectors, where each of the mutually orthogonal class vectors represent a possible classification of a document and where the back-fitting process includes consideration of the probability of a word appearing in a document given a particular topic and the probability of a document belonging to a topic for the corpus of documents;
process a result of back-fitting the generated word vectors to produce a set of document vectors, with each document vector in the set corresponding to one of the documents in the accessed set of documents;
perform a back-fitting process on each document vector in the set of document vectors to produce a set of transformed document vectors;
determine a transformation between the set of document vectors and the set of transformed document vectors;

apply the transformation to a document vector formed from a new document received from a customer to form a transformed document vector for the new document;

compare the transformed document vector for the new document to the set of mutually orthogonal class vectors;

determine a most likely classification for the new document based on the comparison; and based on the most likely classification, route the new document to an appropriate human service agent or initiate a predetermined process to respond to the new document.

18. The non-transitory computer-readable mediums of claim 17, further comprising instructions which, when executed by the one or more computer devices, cause the computing devices to:

for each of a set of previously unclassified documents, determine a classification for each of the previously unclassified documents and process the determined classifications to determine a desired change in an allocation of customer support resources.

19. The non-transitory computer-readable mediums of claim 18, wherein determining a desired change in the allocation of customer support resources comprises one or more of (i) adjusting which agents or queues documents with certain classifications are assigned to, based at least in part on the classification frequency and agent or queue load to minimize wait times (i) activation of an alert to a high volume or increase in volume for certain classifications, and (iii) identification of a trend that represents a volume increase or decrease for certain classifications.

20. The non-transitory computer-readable mediums of claim 17, wherein each document in the set of documents is a text message received from a customer requesting assistance and the new document is a text message.

\* \* \* \* \*